United States Patent
Kennedy, Jr.

(10) Patent No.: US 9,829,137 B2
(45) Date of Patent: Nov. 28, 2017

(54) FLEXIBLE PIPE JOINT

(71) Applicant: GRIFFIN PIPE PRODUCTS CO., INC., Lisle, IL (US)

(72) Inventor: Harold Kennedy, Jr., Fuquay-Varina, NC (US)

(73) Assignee: Griffin Pipe Products Co., LLC, Lisle, IL (US)

(*) Notice: Subject to any disclaimer, the term of this patent is extended or adjusted under 35 U.S.C. 154(b) by 289 days.

(21) Appl. No.: 14/437,152

(22) PCT Filed: Mar. 20, 2015

(86) PCT No.: PCT/US2015/021788
§ 371 (c)(1),
(2) Date: Apr. 20, 2015

(87) PCT Pub. No.: WO2015/143345
PCT Pub. Date: Sep. 24, 2015

(65) Prior Publication Data
US 2016/0305592 A1    Oct. 20, 2016

Related U.S. Application Data

(60) Provisional application No. 61/968,130, filed on Mar. 20, 2014.

(51) Int. Cl.
*F16L 37/52* (2006.01)
*F16L 27/04* (2006.01)
*F16L 37/092* (2006.01)

(52) U.S. Cl.
CPC ............. *F16L 37/52* (2013.01); *F16L 27/04* (2013.01); *F16L 37/0925* (2013.01)

(58) Field of Classification Search
CPC ........ F16L 37/52; F16L 27/04; F16L 37/0925
(Continued)

(56) References Cited

U.S. PATENT DOCUMENTS

| | | | |
|---|---|---|---|
| 2,953,398 A | | 9/1960 | Lawrence |
| 3,724,880 A | * | 4/1973 | Seiler ............. F16L 17/035 285/105 |

(Continued)

FOREIGN PATENT DOCUMENTS

| | | |
|---|---|---|
| CN | 102384324 | 3/2012 |
| EP | 0121322 | 10/1984 |

(Continued)

OTHER PUBLICATIONS

Lee, Jong Kyung "Written Opinion and International Search Report" Korean Intellectual Property Office; dated Jun. 23, 2015; pp. 1-26.

*Primary Examiner* — Aaron Dunwoody
*Assistant Examiner* — Fannie Kee
(74) *Attorney, Agent, or Firm* — Nicholas J. Landau; Bradley Arant Boult Cummings LLP

(57) ABSTRACT

A flexible annular cartridge for joining and sealing a bell and spigot pipe joint, wherein the outer contour of the cartridge is approximately frustoellipsoidal, the cartridge composed of an annular member having outer and inner surfaces and opposite first and second ends, with a plurality of pipe gripping members positioned on the inner surface; a flexible annular gasket having outer and inner surfaces, opposite first and second ends, and a circumferentially extending sealing lip projecting inwardly from the gasket inner surface, in which the annular member first end engages the flexible annular gasket second end; and a backup ring having a hardness that exceeds the hardness of the gasket, in which the backup ring engages the gasket at the gasket first end. Methods are provided for using the cartridge, as well as a pipe joint that contains the cartridge.

28 Claims, 13 Drawing Sheets

(58) Field of Classification Search
USPC ........ 285/110–111, 113, 307, 338–339, 374, 285/379, 910
See application file for complete search history.

(56) References Cited

U.S. PATENT DOCUMENTS

| | | | |
|---|---|---|---|
| 3,963,298 A | | 6/1976 | Seiler |
| 4,138,145 A | | 2/1979 | Lawrence |
| 4,336,014 A | | 6/1982 | Parmann |
| 4,637,618 A | * | 1/1987 | Valls .................... F16L 17/032 277/624 |
| 4,693,483 A | * | 9/1987 | Valls ...................... F16L 47/10 277/624 |
| 4,776,617 A | | 10/1988 | Sato |
| 4,871,197 A | | 10/1989 | Codding, III et al. |
| 5,476,290 A | | 12/1995 | Bergmann et al. |
| 5,897,146 A | | 4/1999 | Saito |
| 6,277,315 B1 | * | 8/2001 | H.ang.llstedt .......... F16L 21/03 264/250 |
| 6,367,802 B1 | | 4/2002 | Knapp |
| 7,140,618 B2 | | 11/2006 | Valls |
| 7,284,310 B2 | * | 10/2007 | Jones .................. F16L 37/0925 277/314 |
| 7,500,699 B2 | | 3/2009 | Snyder |
| 7,537,248 B2 | | 5/2009 | Jones |
| 7,774,915 B2 | | 8/2010 | Darce |
| 7,806,445 B2 | | 10/2010 | Mutschlechner |
| 8,096,585 B2 | | 1/2012 | Vitel |
| 8,235,427 B2 | | 8/2012 | Jones |
| 8,925,977 B2 | | 1/2015 | Holmes |
| 2010/0264645 A1 | * | 10/2010 | Jones .................. F16L 37/0925 285/105 |
| 2014/0191504 A1 | | 7/2014 | Wu |
| 2014/0360004 A1 | | 12/2014 | German |

FOREIGN PATENT DOCUMENTS

| | | |
|---|---|---|
| EP | 1881251 | 1/2008 |
| JP | 5554821 | 7/2014 |
| WO | 2007033390 | 3/2007 |
| WO | 2013171223 | 11/2013 |

* cited by examiner

FLEXIBLE PIPE JOINT

CROSS-REFERENCE TO RELATED APPLICATIONS

This application is a national stage under 35 U.S.C. 371 of International Application PCT/US2015/021788, filed on Mar. 20, 2015 (currently pending). International Application no. PCT/US2015/021788 cites the priority of U.S. provisional patent application No. 61/968,130, filed Mar. 20, 2014.

BACKGROUND

A. Field of the Disclosure

This disclosure relates generally to pipes and, more particularly, to methods and apparatus for joining pipes.

B. Background

Pipe used for underground work is typically provided with a flared bell at one end and a spigot at the opposite end. The inner diameter of the flared bell end is greater than the outer diameter of the spigot end. This allows lengths of pipe to be joined end-to-end by inserting the spigot end of one pipe into the flared bell end of another pipe. Since the inner diameter of the flared bell is greater than the outer diameter of the spigot, an annular space is created therebetween. The annular space is typically sealed by various means in order to prevent fluid leakage when the pipes are connected together. Unfortunately, shifting and settling of the earth may cause deflection between joined pipes which can lead to fluid leakage as well as damage to the pipes themselves. In order to accommodate this shifting and settling, several means have been employed.

Conventional push-on joints have a stationary gasket inside the flared bell of the pipe and seal against the spigot. Deflection of the spigot in the socket occurs due to the clearances provided between the socket and spigot. Typically a tight joint, i.e., with the bell at minimum tolerance inside diameter and the spigot at maximum tolerance outside diameter will deflect considerably less than a loose joint with the minimum spigot and maximum bell. However, stationary gaskets frequently catch on the spigot during insertion of the spigot into the socket, resulting in a bad seal.

Other means have also been employed to accommodate the shifting and settling and also to accommodate the shaking during an earthquake. Some joints utilize a ball and socket joint, wherein a stationary gasket in the large flared socket seals against a spherically shaped spigot. The spherically shaped spigot is a separate casting and must be attached to the straight spigot by some mechanical means. This creates potential weaknesses in the pipe, increases the cost of manufacturing, and increases the complexity of assembly. Flexible expansion joints are also used to accommodate these large deflections. In all cases these flexible expansion joints require a raised rib or stop on the spigot to prevent separation and a unitary ball for the gasket to seal upon. Because many flexible expansion joints comprise two separate ball joints and a middle expansion joint, the ball joints have to be connected to a pipe end or spigot through a flange joint or usually a mechanical joint with restraint. That is, the ends of the ball joints have either a Flange or an MJ joint which can then be connected to a pipe spigot, introducing additional potential points of mechanical weakness and further complexity of assembly.

SUMMARY

The following presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

A flexible annular cartridge is provided for joining and sealing a bell and spigot pipe joint, wherein the outer contour of the cartridge is approximately frustoellipsoidal, the cartridge comprising: (a) an annular member having outer and inner surfaces and opposite first and second ends, comprising a plurality of pipe gripping members positioned on the inner surface; (b) a flexible annular gasket having outer and inner surfaces, opposite first and second ends, and a circumferentially extending sealing lip projecting inwardly from the gasket inner surface, wherein the annular member first end engages the flexible annular gasket second end; and (c) a backup ring having a hardness that exceeds the hardness of the gasket, wherein the backup ring engages the gasket at the gasket first end. In some embodiments, the outer contour of the cartridge is approximately frustospherical.

A method of joining and sealing a bell and spigot pipe joint is provided, the method comprising: (a) providing a pipe socket having an approximately ellipsoidal inner contour, and defining an opening and a longitudinal socket axis; (b) providing the flexible annular cartridge which defines a longitudinal cartridge axis; (c) orienting the cartridge such that the longitudinal cartridge axis is approximately perpendicular to the longitudinal socket axis; (d) inserting the cartridge into the socket; and (e) rotating the cartridge such that the longitudinal cartridge axis is approximately parallel to the longitudinal socket axis.

A pipe joint is provided, comprising: a pipe socket having an ellipsoidal inner contour; and the flexible annular cartridge inserted within the socket, such that the outer contour of the cartridge complements the inner contour of the socket, and such that the cartridge is free to rotate within the socket.

Embodiments of the present disclosure allow for the deflection of a pipe joint with a gasket sealing on the inside of a frustoellipsoidal shaped socket and plain spigot. Some such embodiments prevent joint separation and gasket blowout via interconnected gripping members acting on a spigot. Such embodiments are advantageous in that a socket can be cast as an integral part of a pipe with no requirement for a separate ball casting to be mechanically attached to a spigot.

BRIEF DESCRIPTION OF THE DRAWINGS

The accompanying drawings, which form a part of the specification, illustrate some exemplary embodiments.

DETAILED DESCRIPTION

Figure 1:
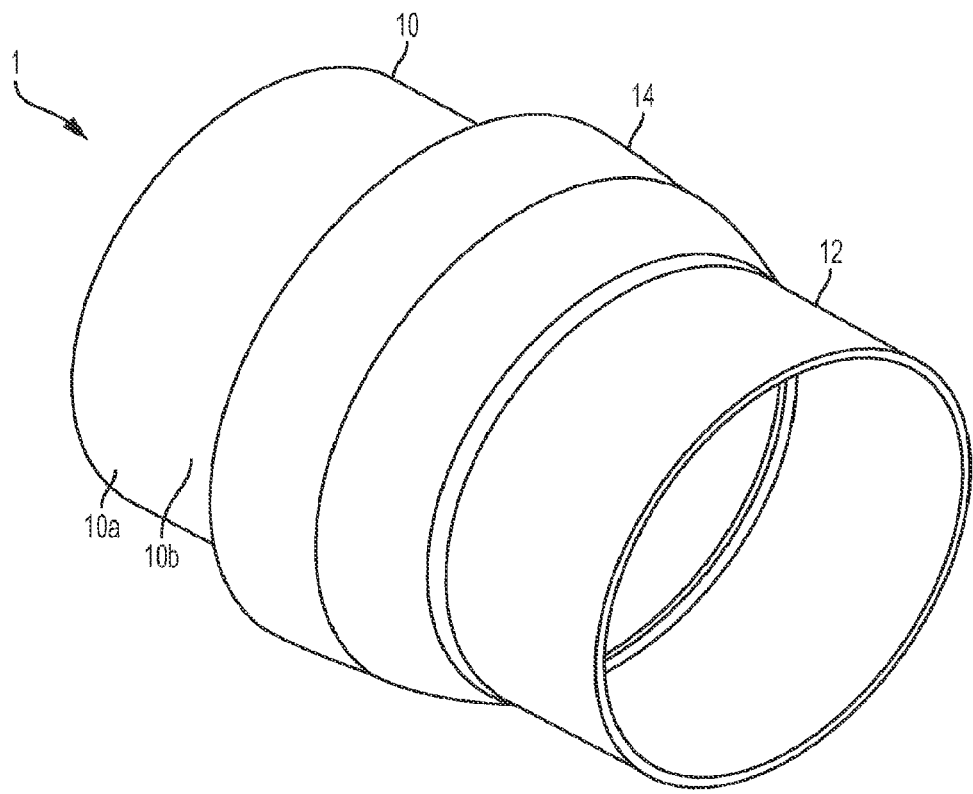
FIG. 1 is a perspective view of a portion of two pipes joined together, one pipe having a spigot end inserted within a bell end of the other.
Figure 2:
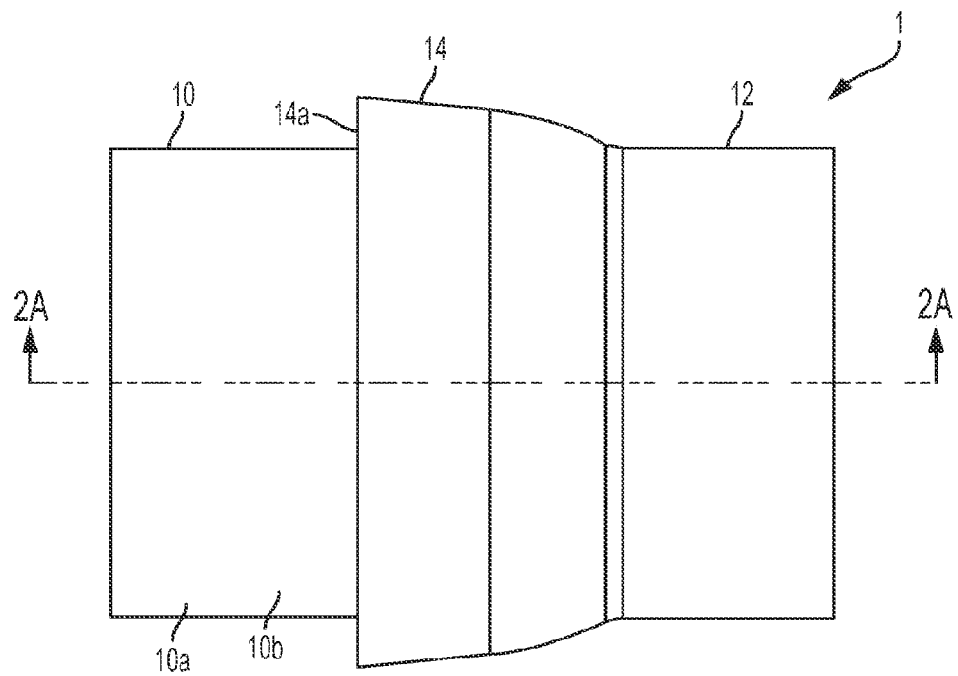
FIG. 2 is a plan view of the two pipes of FIG. 1.

The present subject matter of the disclosure will now be described more fully hereinafter with occasional reference to the accompanying figures, in which embodiments of the cartridge, method, and joint are shown. These may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

A. DEFINITIONS

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well known functions or constructions may not be described in detail for brevity and/or clarity.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

As used herein, phrases such as "between X and Y", "X-Y", "between about X and Y", and "about X-Y" should be interpreted to include X and Y. As used herein, phrases such as "between about X and Y" and "about X-Y" mean "between about X and about Y." As used herein, phrases such as "from about X to Y" and "from about X-Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

The terms "about" and "approximately" shall generally mean an acceptable degree of error or variation for the quantity measured given the nature or precision of the measurements. For example, when these terms are used in the context of durometer values they account for the lack of precision generally resulting from durometer measurements. Typical, exemplary degrees of error or variation are within 20 percent (%), preferably within 10%, and more preferably within 5% of a given value or range of values. Numerical quantities given herein are approximate unless stated otherwise, meaning that the term "about" or "approximately" can be inferred when not expressly stated.

The terms "bell", "bell end", "bell socket", as used herein, are interchangeable and refer to the enlarged female end of a pipe configured to receive a portion of an adjoining pipe therein.

The term "ellipsoid" refers to a closed quadric surface that is a three-dimensional analogue of an ellipse. As defined herein, a sphere is one species of ellipsoid. The term "frustoellipsoidal" means having the shape of a frustum of an ellipsoid, i.e. an ellipsoid that is truncated by two planes. The term "frustospherical" means having the shape of a frustum of a sphere, i.e. a sphere that is truncated by two planes. A frustoellipsoidal object may be frustospherical (and all frustospherical objects are frustoellipsoidal).

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Such addition of other elements that do not adversely affect the operability of what is claimed for its intended purpose as stated in this disclosure would not constitute a material change in the basic and novel characteristics of what is claimed.

As used herein, the common abbreviation "e.g." means "exempli gratia," and may be used to introduce or specify a general example or examples of a previously mentioned item, and is not intended to be limiting of such item.

As used herein, the common abbreviation "i.e.", means "id est," and may be used to specify a particular item from a more general recitation.

B. ANNULAR CARTRIDGE

A flexible annular cartridge 20 is provided for joining and sealing a bell and spigot pipe joint 1, wherein the outer contour of the cartridge is approximately frustoellipsoidal, the cartridge 20 comprising: an annular member 30 having outer and inner surfaces (30a and 30b) and opposite first and second ends (30c and 30d), comprising a plurality of pipe gripping members 40 positioned on the inner surface 30a; a flexible annular gasket 50 having outer and inner surfaces (50a and 50b), opposite first and second ends (50c and 50d), and a circumferentially extending sealing lip 52 projecting inwardly from the gasket inner surface 50a, wherein the annular member first end 30c engages the flexible annular gasket second end 50d; and a backup ring 70 having a hardness that exceeds the hardness of the gasket 50, wherein the backup ring 70 engages the gasket 50 at the gasket first end 50c. In some embodiments, the outer contour of the cartridge 20 is approximately frustospherical.

The annular cartridge 20 may be adapted to be inserted within a bell socket 14 to surround and seal a pipe spigot 10a inserted therein. The illustrated annular cartridge 20 in FIGS. 3 and 4 (shown in cross-section view) is located within the bell socket 14 of pipe 12. As will be described in detail with respect to FIGS. 6-10, the annular member 30 and the flexible annular gasket 50 may be secured together.

The annular member 30 may be constructed from any suitable material. Ideally it will be durable enough to retain the spigot 10a in the socket 14 under separating forces. In an exemplary embodiment, the annular member 30 is constructed from a metal material. In a specific embodiment the annular member 30 is constructed from ductile iron. The annular member 30 may also be constructed from a polymeric material sufficiently resistant to deformation to prevent extrusion of the cartridge 20 after insertion into the pipe joint 1 under operating pressure. The materials would depend on the intended operating pressure, as understood by those of ordinary skill in the art.

Figure 6:
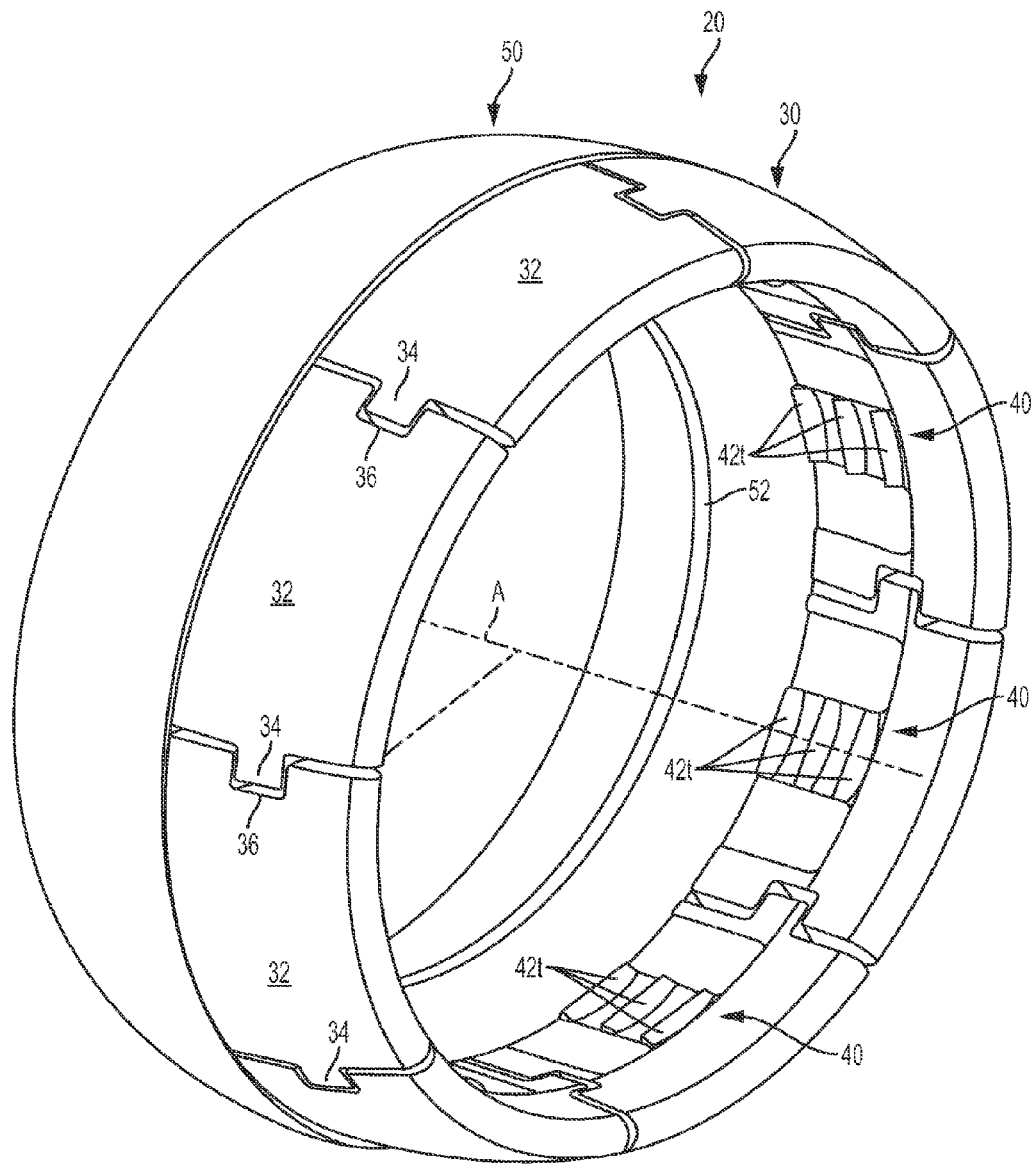
FIG. 6 is a perspective view of an embodiment of the flexible annular cartridge for joining two pipes together.
Figure 7:
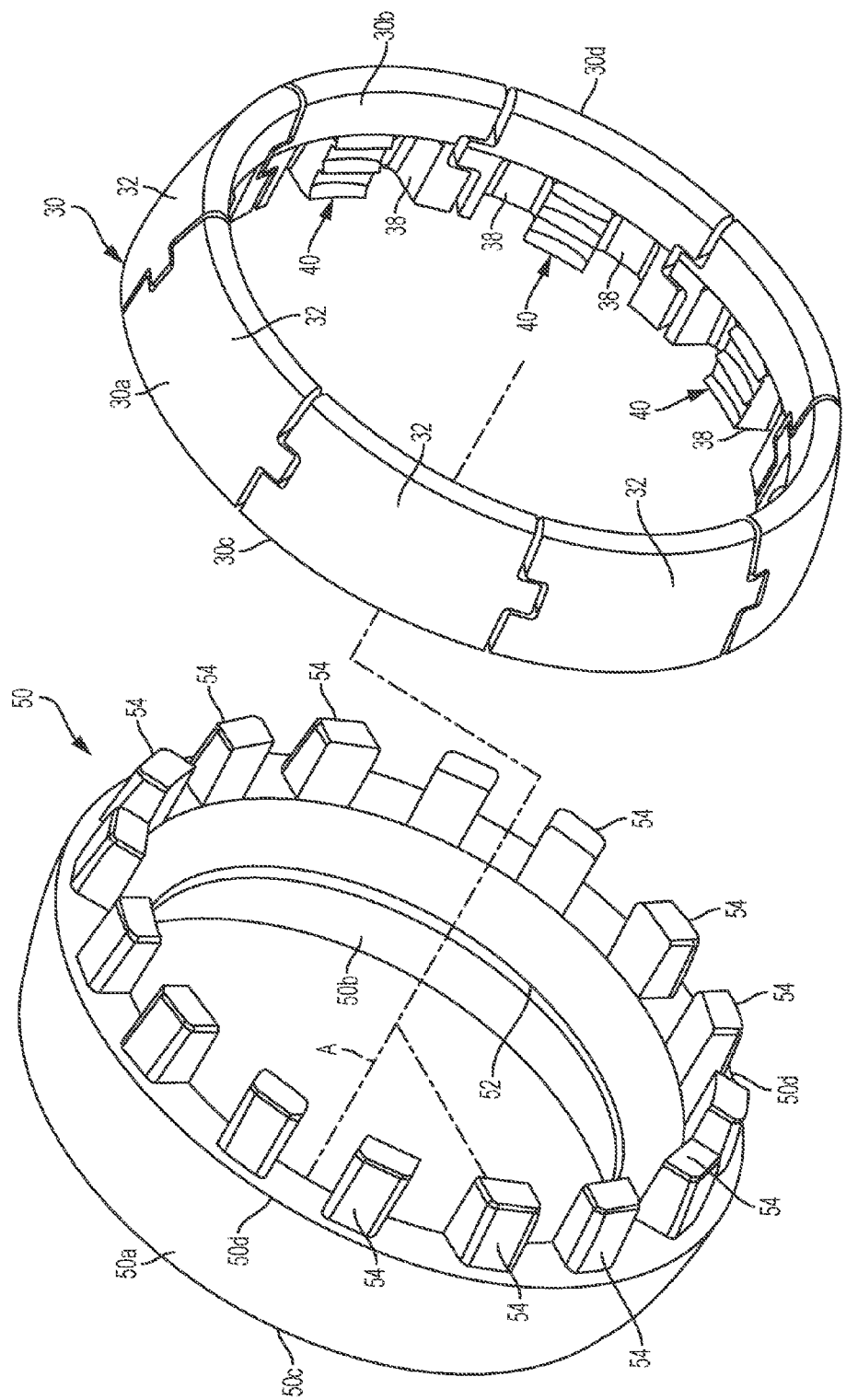
FIG. 7 is an exploded view of the flexible annular cartridge of FIG. 6 illustrating the annular member and the flexible annular gasket.
Figure 8:
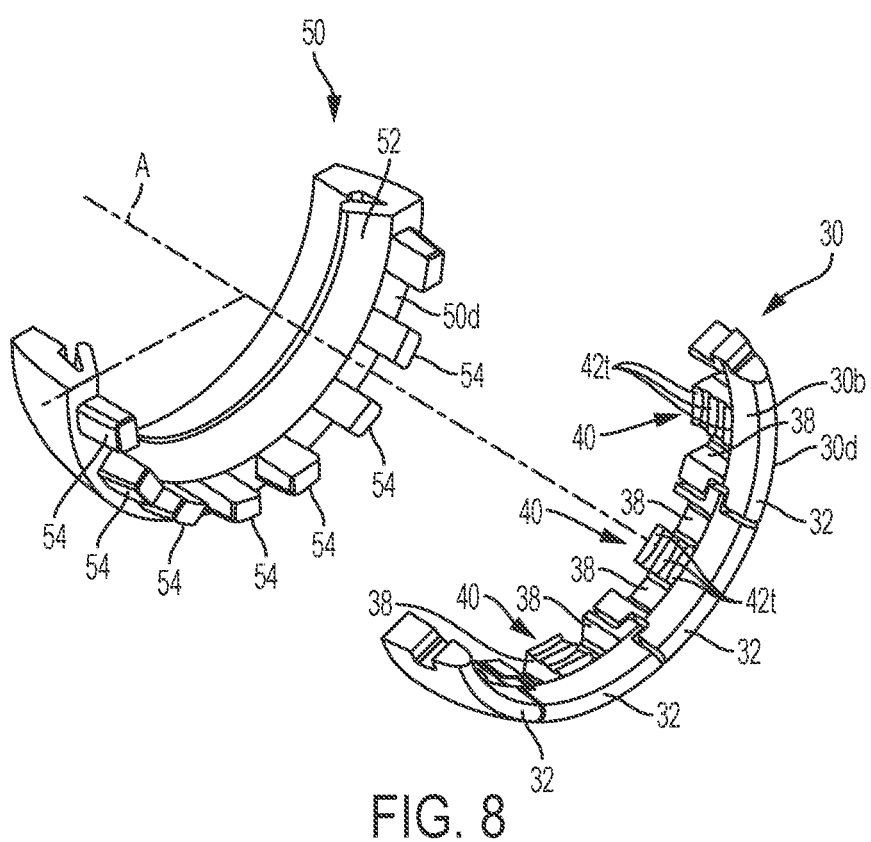
FIG. 8 is an exploded partial view of the flexible annular cartridge of FIG. 6 cut in half and illustrating the annular member, the flexible annular gasket, and the sealing lip of the flexible annular gasket.

As illustrated in FIGS. 6-7, the annular member 30 may include a plurality of circumferentially spaced-apart pipe gripping members or wedges 40. In general the gripping members 40 are harder than the material from which the pipe spigot 10a is constructed, such that the gripping members 40 will dig into the outer surface of the spigot 10a when under a separating force. For example, the gripping elements 40 may have a hardness of about 40-55 according to the ASTM E18-2000 standard employing the Rockwell C scale (this range is particularly suitable for the use of ductile iron pipe spigots). In the illustrated embodiment, each pipe gripping member 40 includes a pair of adjacent teeth 42t extending from surface 40a thereof. In addition, in the illustrated embodiment of FIGS. 3 and 4, the backup ring 70 is adjacent to the flexible annular gasket 50.

The gasket 50 may be constructed of any elastomeric material that is known in the art to be suitable in pipe joints carrying various fluids, such fluids including but not limited to water, treated drinking water, wastewater, natural gas, liquefied natural gas, steam, and compressed air. For example, suitable elastomers for pipe joints carrying water at ambient temperatures include styrene butadiene rubber, ethylene propylene diene monomer, nitrile, and neoprene. Also as described in more detail below, in some embodiments, the flexible annular gasket 50 includes a plurality of prongs 54 that extend outwardly from the second end 50d thereof. The prongs 54 are configured to engage a respective plurality of cavities 38 formed within the annular member first end 30c. In some embodiments, each one of the plurality of prongs 54 is adhesively secured within a respective one of the plurality of cavities 38, by virtue of an adhesive.

A conventional push-on joint requires the gasket placed inside the bell to remain stationary during insertion of the spigot. As is frequently the case, as the spigot is pushed into the socket, it catches the gasket and dislodges it causing a leak. In some designs an annular surface, perpendicular to the longitudinal axis of the pipe, is cast within the socket as a stop for the gasket to bear against during spigot insertion to prevent the dislodging of the gasket. Applicant discovered that this function can be provided by a movable backup ring 70 (FIGS. 3, 4) placed beyond the sealing gasket 50 (FIGS. 3, 4) in the bottom of a socket 14.

The backup ring 70 may have a hardness that exceeds the hardness of the gasket 50 in order to resist "fish-mouthing" under high pressures. Some embodiments of the backup ring 70 have a hardness of at least about 70 according to the ASTM D2240 standard employing durometer type Shore A. Further embodiments of the backup ring 70 have a hardness of about 70-95 according to the ASTM D2240 standard employing durometer type Shore A. Still further embodiments of the backup ring 70 have a hardness of about 75-90 according to the ASTM D2240 standard employing durometer type Shore A. Any of the above cartridges, in a specific embodiment of the backup ring 70 has a hardness of about 80 according to the ASTM D2240 standard employing durometer type Shore A. A backup ring 70 with excessively high hardness tends to be brittle, and may crack, while a backup ring 70 with excessively low hardness will tend to deform or "fishmouth" when pressed against the socket 14 under pressure.

Some embodiments of this backup ring 70 serve as a stop to prevent the gasket 50 from dislodging during insertion of the spigot 10a, yet move with the gasket 50 as deflection takes place. In some embodiments, the backup ring 70 is an integral part of the cartridge 20, and may be molded or adhered to the sealing gasket 50 and gripping members 40, but in other embodiments it can be a separate component. In some embodiments, the backup ring 70 is harder than the sealing portion of the gasket 50. However, the backup ring 70 is flexible enough as a ring to be inserted into the bell 14.

Figure 4:
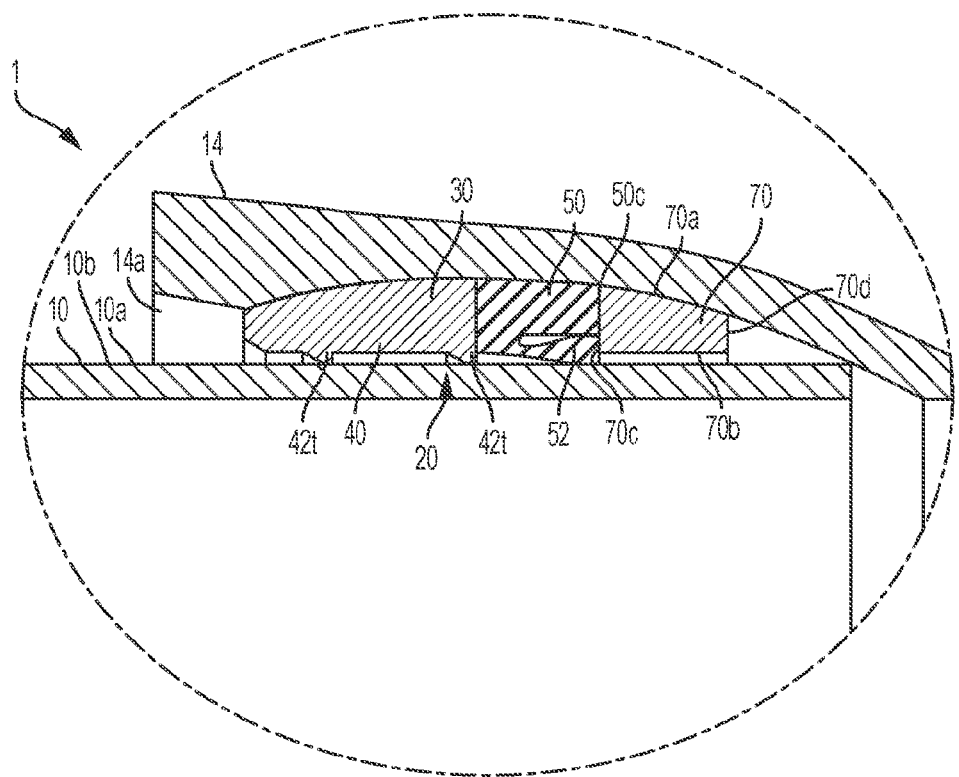
FIG. 4 is an enlarged cross-sectional view of the flexible annular cartridge of FIG. 3.
Figure 5:
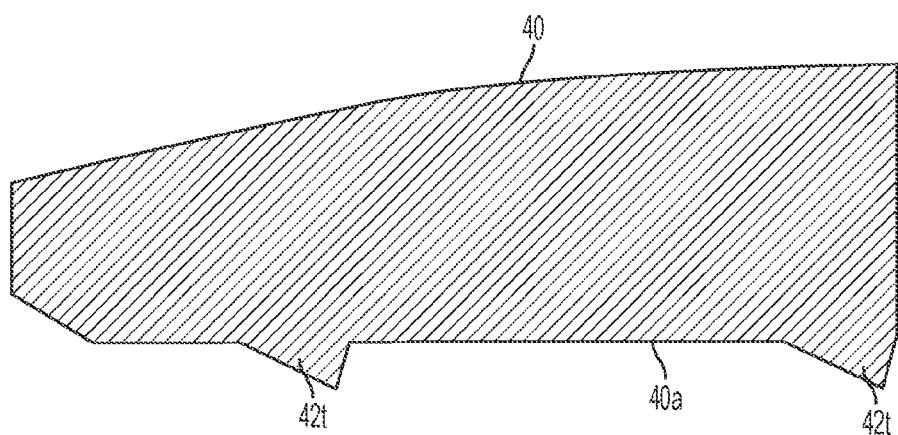
FIG. 5 is an enlarged cross-sectional view of a pipe gripping member in the flexible annular cartridge of FIG. 3.

In the embodiment illustrated in FIG. 4, the backup ring 70 includes outer and inner surfaces 70a, 70b, and opposite first and second ends 70c and 70d. The backup ring first end 70c is configured to engage the flexible annular gasket first end 50c. In some embodiments, the backup ring first end 70c matingly engages and/or adhesively engages the flexible annular gasket first end 50c.

Referring now to FIGS. 6-10, the flexible annular cartridge 20 for joining and sealing a bell socket and spigot pipe joint 1 will be described in detail. The flexible annular cartridge 20 defines a longitudinal cartridge axis A and includes annular member 30 connected to flexible annular gasket 50. The illustrated annular member 30 has outer and inner surfaces 30a, 30b and opposite first and second ends 30c, 30d. A plurality of pipe gripping members 40 are positioned on the annular member inner surface 30b in circumferentially spaced-apart relationship.

Some embodiments of the annular member 30 comprise a plurality of interlocking segments 32, each segment comprising a pipe gripping member 40 positioned to grip a surface of the pipe spigot 10a. The segments 32 may be interlocked so as to allow them to flex relative to one another, although the segments 32 themselves need not be significantly flexible. In such embodiments the segmented nature of the annular member 30 allows the annular member 30 to be constructed of a hard and durable material, while still allowing the annular member 30 to deform radially as necessary for insertion into a pre-formed pipe bell 14.

Figure 9:
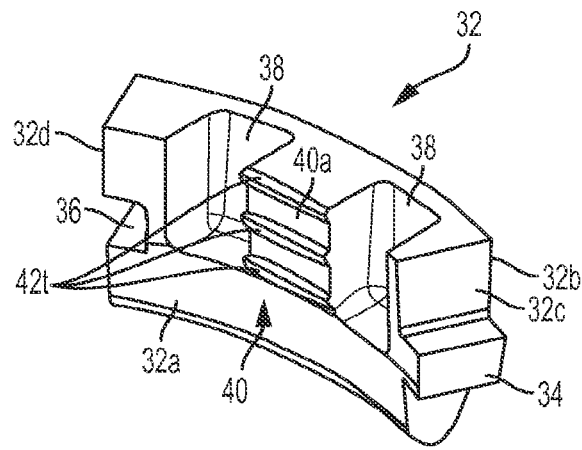
FIG. 9 is a perspective view of an interlocking segment of the annular member of FIG. 8.
Figure 10:
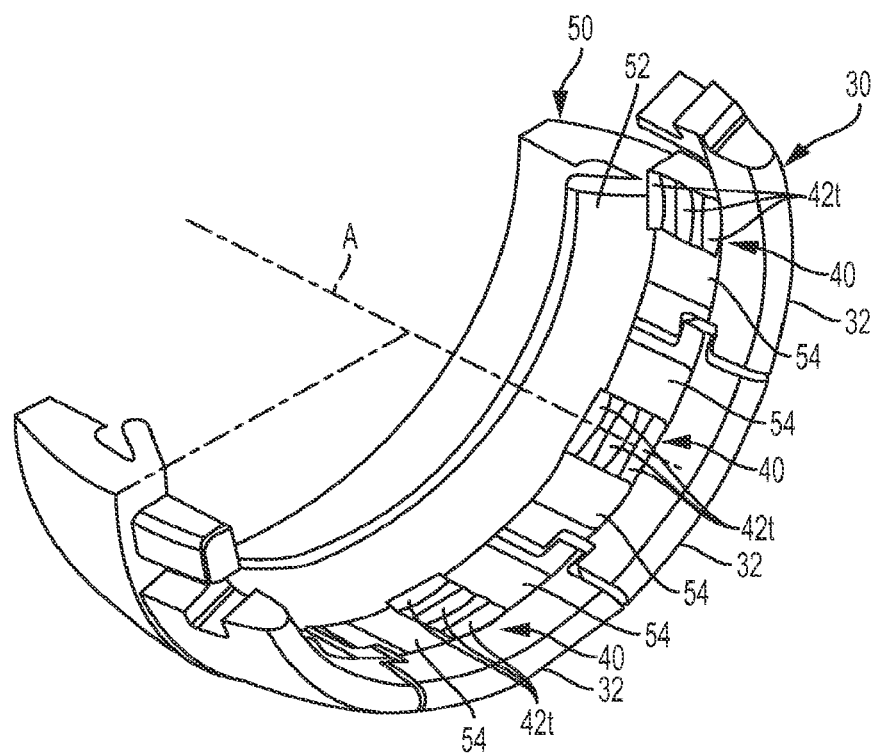
FIG. 10 is a perspective view of the flexible annular cartridge of FIG. 6 cut in half to better illustrate the sealing lip of the flexible annular cartridge.

The illustrated annular member 30 includes a plurality of circumferentially interlocking elements or segments 32. As illustrated in FIG. 9, each segment 32 includes inner and outer surfaces 32a, 32b and opposite first and second ends 32c, 32d. A male connector 34 extends outwardly from first end 32c and a female connector 36 is located within second end 32d, as illustrated. The annular member 30 is assembled by arranging the plurality of segments 32 such that a male connector 34 of an element engages a female connector 36 of an adjacent element 32. When assembled into the annular member 30, the plurality of elements 32 do not require adhesive or other fastening means to remain connected as the annular member 30. However, such adhesive or fastening means may be employed to increase the strength of the engagement between the gasket 50 and the annular member 30.

Figure 3:
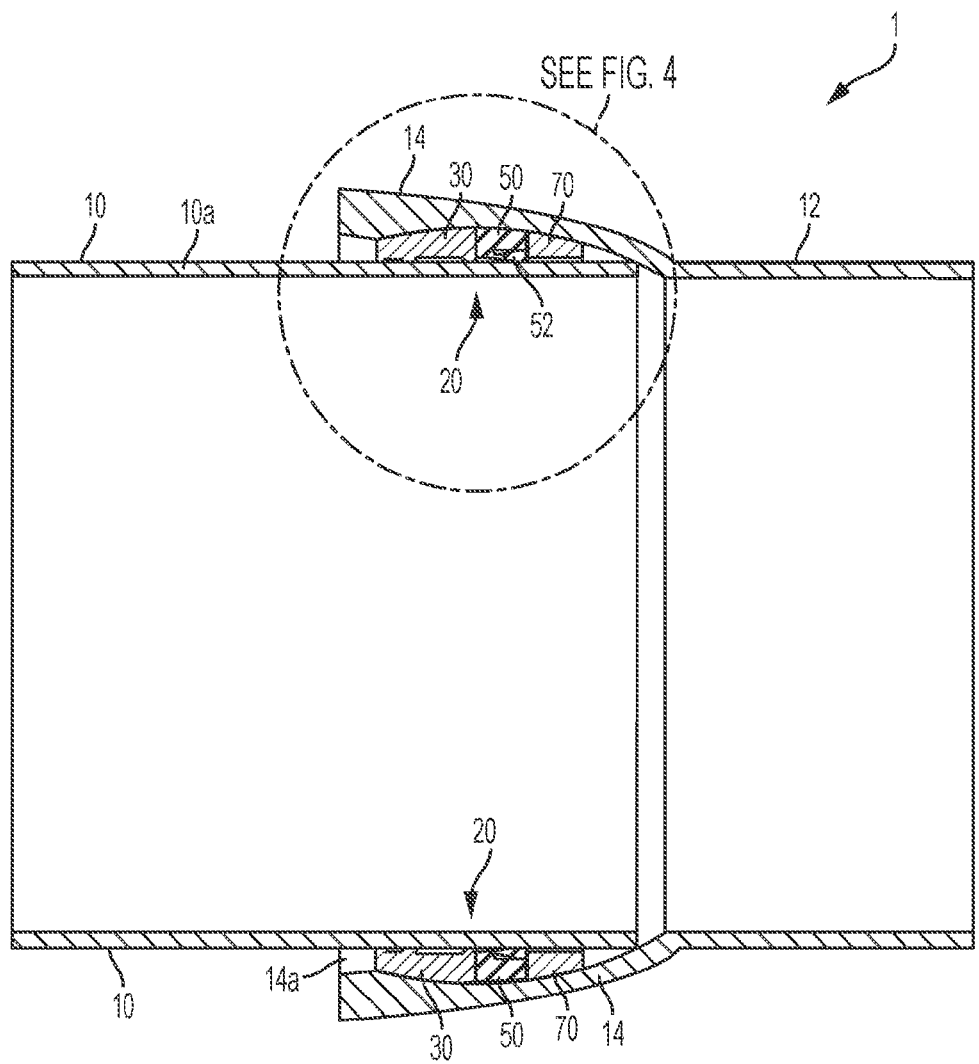
FIG. 3 is a cross-sectional view of the two pipes of FIG. 2 taken along lines 2A-2A, and illustrating an embodiment of the flexible annular cartridge joining the two pipes together.

Each illustrated segment 32 includes a pipe gripping member 40 configured to grip a surface of a pipe spigot 10a (FIG. 3). Under external forces or internal pressure tending to withdraw the pipe end (i.e., pipe spigot 10a) from the bell socket 14, the pipe gripping members 40 act against the external surface 10b of the spigot 10a and clamp the pipe end, preventing its withdrawal.

In the illustrated embodiment, each pipe gripping member 40 includes a pipe engaging face 40a with a plurality of elongated teeth 42t extending outwardly from the pipe engaging face 40a in adjacent, spaced-apart relationship. In the illustrated embodiment, each pipe gripping member 40 has three teeth 42t. However, embodiments of the present gripping member 40 are not limited to the illustrated configuration. Various numbers of teeth 42t, including a single tooth 42t, may be utilized. In addition, embodiments of the interlocking segment 32 do not require that each interlocking segment 32 have a pipe gripping member 40. As such, the annular member 30 may include any number of pipe gripping members 40 and may include even a single pipe gripping member 40.

In some embodiments, each elongated tooth 42t has an arcuate configuration that substantially conforms to an outer surface 10b of a pipe spigot 10a (FIG. 3). However, in other embodiments, each elongated tooth 42t may be substantially straight (i.e., non-arcuate).

Each of the illustrated interlocking segments 32 includes a cavity 38 formed on each side of the pipe gripping member 40. These cavities 38 are utilized for engagement with the flexible annular gasket 50, as will be described below.

In some embodiments, the interlocking segments 32 are formed from ductile iron, and may be formed via sand molded casting. However, various types of materials may be utilized, as well as various manufacturing techniques.

The illustrated flexible annular gasket 50 includes outer and inner surfaces 50a, 50b, and opposite first and second ends 50c, 50d. A circumferentially extending sealing lip 52 projects inwardly from the gasket inner surface 50b (best seen in FIG. 8). The sealing lip 52 is configured to snugly and sealingly engage the outer surface 10b of a pipe spigot 10a (FIG. 3) inserted therethrough. The flexible annular gasket 50 may be formed from an elastomeric material, such as rubber, and the like.

The illustrated annular gasket 50 includes a plurality of prongs 54 that extend outwardly from the second end 50d. The prongs 54 are configured to engage a respective plurality of cavities 38 within the annular member 30. As such, the annular member first end 30c is secured to the flexible annular gasket second end 50d.

In some embodiments, each one of the plurality of prongs 54 is adhesively secured within a respective one of the plurality of cavities 38. However, embodiments of the present invention do not require the use of adhesive. Moreover, the illustrated prongs 54 and the corresponding cavities 38 may have various shapes and configurations. Embodiments of the present invention are not limited to the illustrated configuration of either.

C. METHOD OF JOINING AND SEALING A BELL AND SPIGOT PIPE JOINT

A method of joining and sealing a bell and spigot pipe joint 1 is provided, the method comprising: providing a pipe socket 14 having an approximately ellipsoidal inner contour, and defining an opening 14a and a longitudinal socket axis B; providing the flexible annular cartridge 20 as described above, defining a longitudinal cartridge axis A; orienting the cartridge 20 such that the longitudinal cartridge axis A is approximately perpendicular to the longitudinal socket axis B; inserting the cartridge 20 into the socket 14; and rotating the cartridge 20 such that the longitudinal cartridge axis A is approximately parallel to the longitudinal socket axis B. The cartridge 20 may be any disclosed in the previous sections. The method may further comprise inserting a pipe spigot 10a through the cartridge 20 into the socket 14.

The opening 14a defined by the socket 14 refers to the mouth of the bell, and should not be confused with any other opening on the pipe 12 connected to the socket 14. The socket 14 also defines a longitudinal socket axis B, which is the axis parallel to the direction of fluid flow through the pipe joint 1. The longitudinal socket axis B can also be defined as the axis that is perpendicular to the radial axes of the socket 14. Likewise, the flexible annular cartridge 20 defines a longitudinal cartridge axis A (FIG. 6), which is the axis that is perpendicular to the radial axes of the annulus.

The flexible properties of the cartridge 20 allow it to be deformed to decrease one of its radial dimensions so as to allow it to pass through the opening of the socket 14 to be inserted, and afterward resume its relaxed shape. The method may thus comprise stretching the cartridge 20 in a radial direction that is approximately parallel to the longitudinal socket axis B during insertion. Some embodiments of the method comprise compressing the cartridge 20 in a first radial direction prior to or during insertion, or compressing the cartridge 20 in a first radial direction and distending the cartridge 20 in a second radial direction approximately perpendicular to the first radial direction prior to or during insertion. The stretching, compressing, and distending of the cartridge 20 is distinct from the conventional means of inserting a thin flexible gasket by folding it in on itself, to form a saddle shape (or a C shape as seen edgewise). Some embodiments of the cartridge 20 of the instant disclosure are capable of flexing to increase or decrease a given radial diameter, but cannot flex to form a saddle shape or a C shape as seen edgewise. Thus they can be stretched to form an ellipse when viewed from the front.

Figure 11:
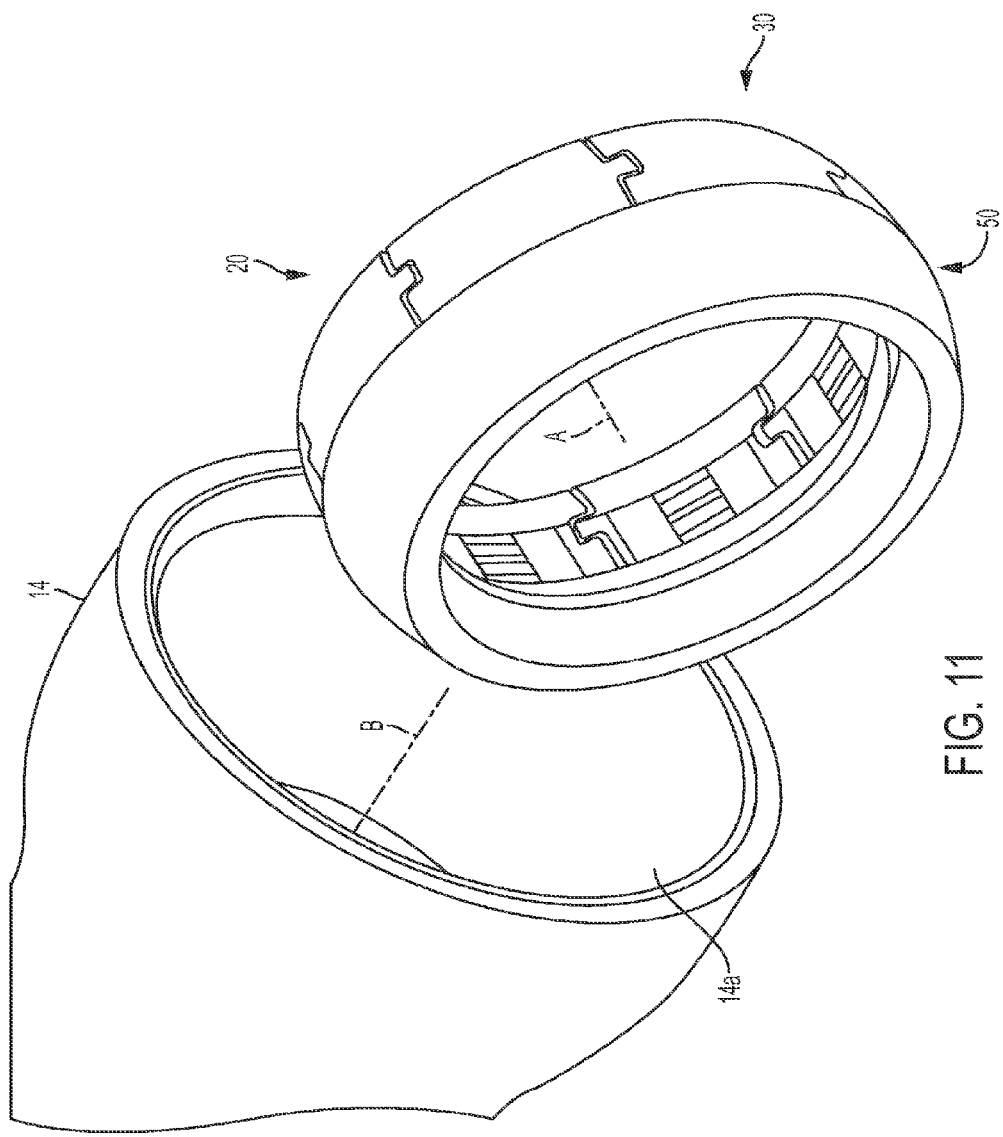
FIG. 11 illustrates a step in an embodiment of the method of joining and sealing a bell and spigot pipe joint with the flexible annular cartridge of FIG. 6, in which the cartridge is approximately perpendicular to the axis of the socket prior to insertion.
Figure 12:
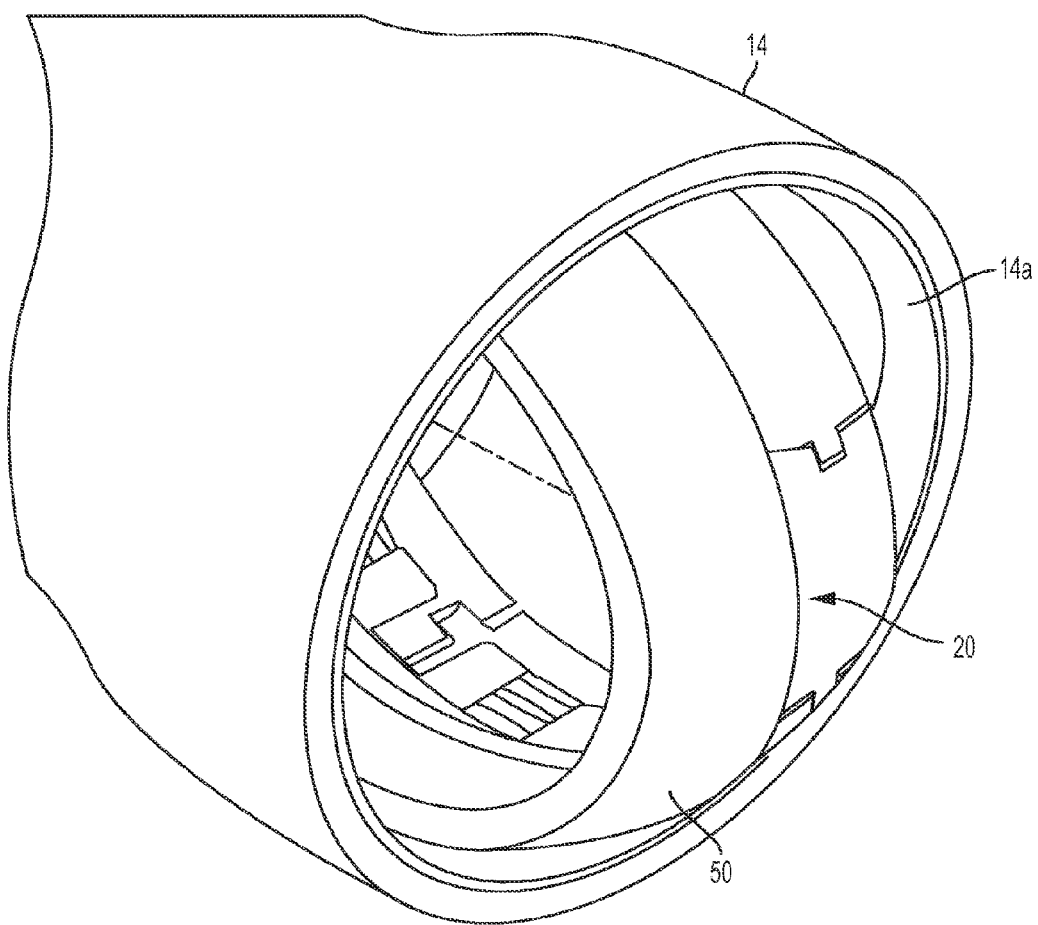
FIG. 12 illustrates a step in an embodiment of the method of joining and sealing a bell and spigot pipe joint with the flexible annular cartridge of FIG. 6, in which the cartridge is inserted into the socket.
Figure 13:
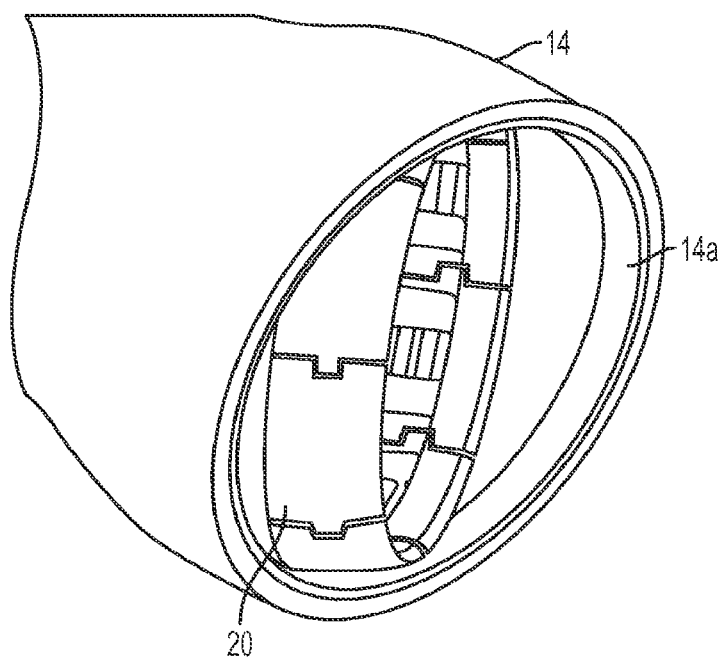
FIG. 13 illustrates a step in an embodiment of the method of joining and sealing a bell and spigot pipe joint with the flexible annular cartridge of FIG. 6, in which the cartridge is further rotated while in the socket.
Figure 14:
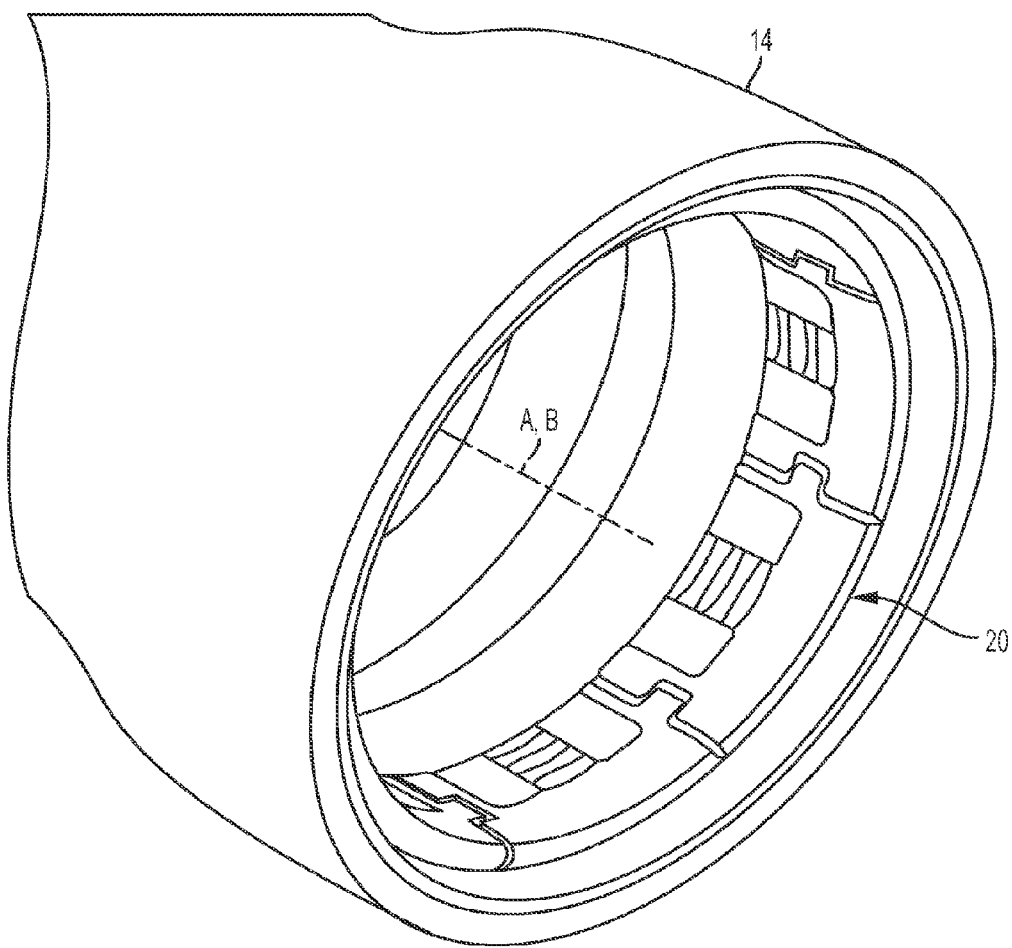
FIG. 14 illustrates a step in an embodiment of the method of joining and sealing a bell and spigot pipe joint with the flexible annular cartridge of FIG. 6, in which the cartridge has been rotated while in the socket such that the cartridge axis is parallel to the socket and the annular member faces outward toward the bell end.

Referring to the example in FIGS. 11-14, the flexible cartridge 20 is illustrated being placed within the bell socket 14 of a pipe 12 and ready to receive a pipe spigot 10a therein. In FIGS. 11 and 12, the flexible cartridge 20 is rotated ninety degrees (90°) relative to the opening 14a of the bell socket 14 and then inserted into the bell socket 14. The flexibility of the cartridge 20 allows the cartridge 20 to be deformed for insertion into the bell socket 14. The cartridge 20 also has resiliency such that it returns to its former shape once inserted into the bell socket 14. As illustrated in FIGS. 13-14, the cartridge 20 is rotated ninety degrees (90°) relative to the opening 14a of the bell socket 14 and such that the annular member 20 is facing outwardly. The annular member 30 prevents the displacement of the annular gasket 50 into the bell socket 14 during insertion of a pipe spigot 10a of an adjoining pipe 10.

Figure 15:
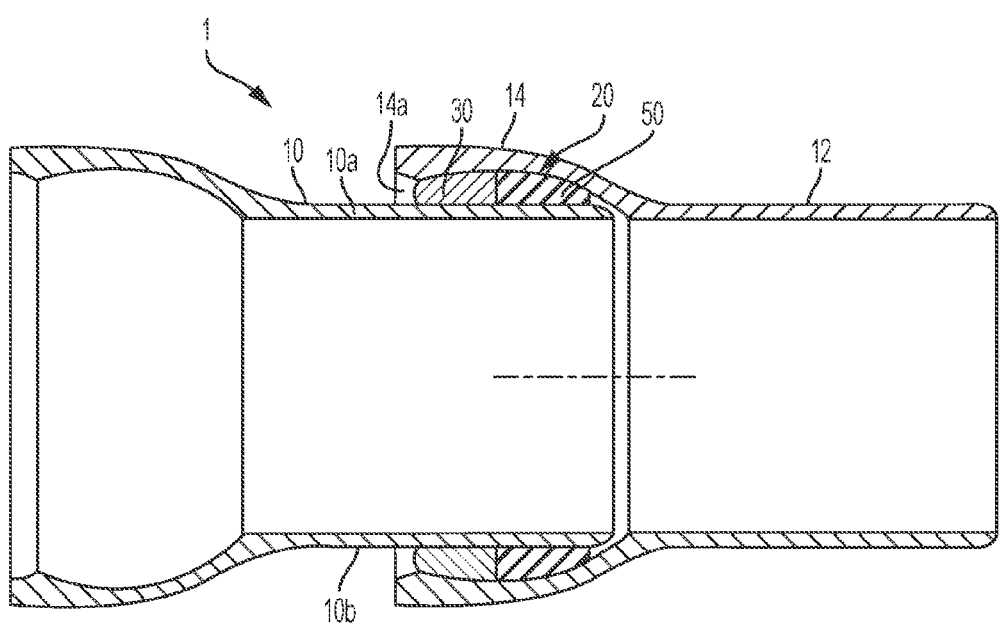
FIG. 15 is a cross-sectional view of two pipes joined together via the flexible annular cartridge of FIG. 6.
Figure 16:
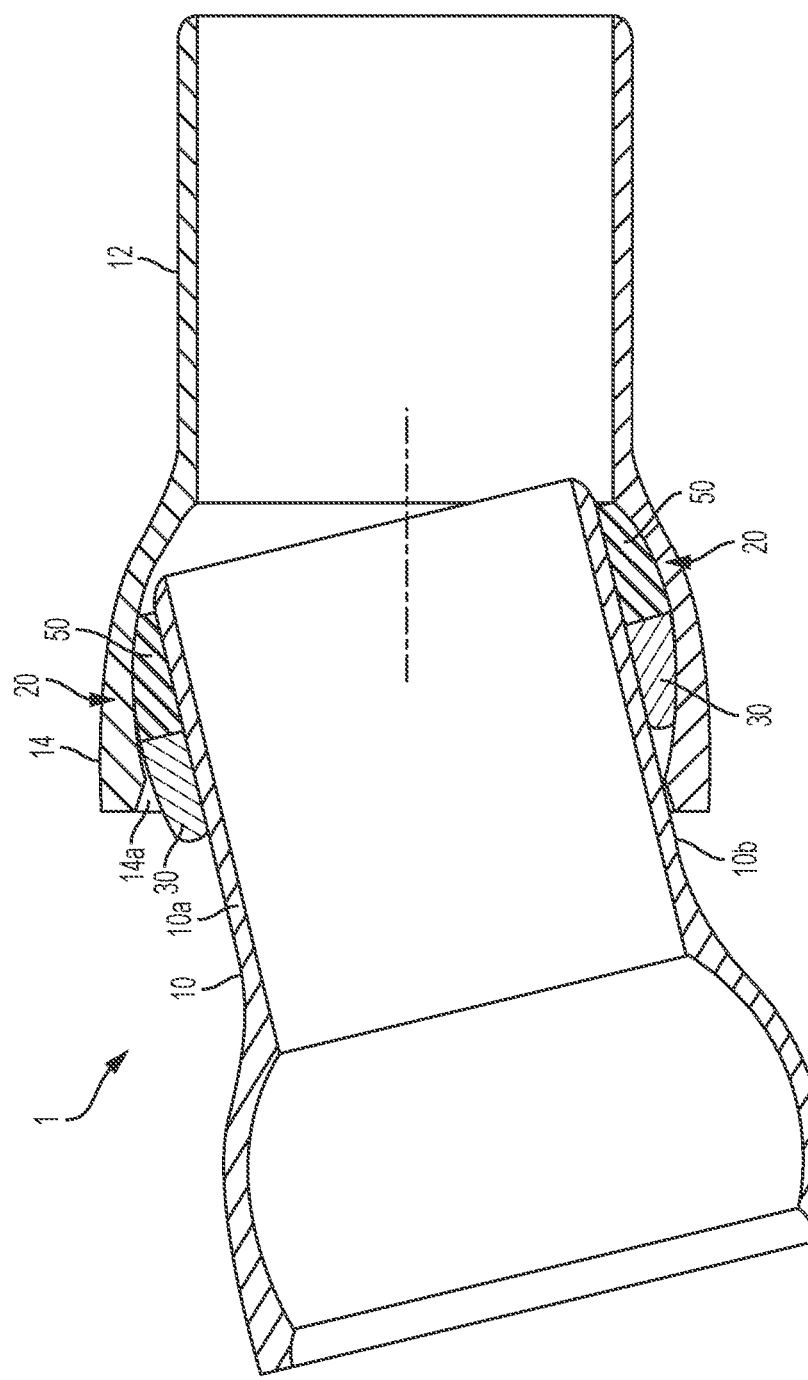
FIG. 16 illustrates deflection of the two pipes of FIG. 15.

The end of an adjoining pipe spigot 10a (FIG. 15) is inserted into the bell socket opening 14a and through the annular member 30 of the cartridge 20. The insertion is completed when the pipe end 10a passes through the annular gasket 50, as illustrated in FIG. 15. The pipe gripping members 40, which surround the pipe end 10a, stabilize the cartridge 20 during insertion. The cartridge 20 simulates an ellipsoid or sphere and the adjoining pipe 10 can then be deflected from alignment with the axis of the first pipe 12 by as much as fifteen degrees (15°), as illustrated in FIG. 16.

D. PIPE JOINT

A pipe joint 1 is provided, comprising: a pipe socket 14 having an ellipsoidal inner contour; and the flexible annular cartridge 20 as described above inserted within the socket 14, such that the outer contour of the cartridge 20 complements the inner contour of the socket 14, and such that the cartridge 20 is free to rotate within the socket 14. The outer contour of the cartridge 20 complements the inner contour of the socket 14 such that they define roughly identical frustums of ellipses, although it is to be understood that the outer contour of the cartridge 20 will be smaller than the inner contour of the socket 14, to a degree that will allow rotation of the cartridge 20 within the socket 14 while still allowing the socket 14 to be sealed with the cartridge 20. The joint 1 may include a pipe spigot 10a inserted within the socket 14 and through the cartridge 20. In some such embodiments of the joint 1 the spigot 10a is sealed by the cartridge 20.

In some embodiments of the joint 1, the outer contour of the cartridge 20 complements the inner contour of the socket 14 such that the cartridge 20 is free to rotate with at least two degrees of freedom within the socket 14. In further embodiments of the joint 1, the outer contour of the cartridge 20 complements the inner contour of the socket 14 such that the cartridge 20 is free to rotate with three degrees of freedom within the socket 14. Because the flexible annular cartridge 20 may be inserted into the bell 14 after casting, in some embodiments of the joint 1 the pipe socket 12 is an integral part of a pipe. For example, the pipe socket may be integrally cast (or otherwise manufactured) as part of the pipe 12.

As discussed above, conventional pipe bells often contain a raised stop which serves to arrest the motion of a gasket within the bell; however, it is not unusual for the gasket to catch on the stop, compromising the integrity of seal. Because some embodiments of the flexible annular cartridge 20 employ the backup ring 70 to hold the cartridge 20 in place within the bell 14, no raised stop is necessary in the bell 14. Therefore in some embodiments of the joint 1 the socket 14 has no such raised stop on the inner surface.

Referring now to FIGS. 1-5, two pipes 10, 12 joined together via the flexible annular cartridge 20 (FIG. 3) are illustrated. Pipe 10 has a spigot portion 10a that is inserted within the bell socket 14 of the other pipe 12 and through the flexible annular cartridge 20, which grips and holds the pipe 10. The bell socket 14 has an internal surface in the form of a sphere.

E. CONCLUSION

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for the convenience of the reader or otherwise to provide organizational queues. These headings shall not limit or characterize the invention(s) set forth herein.

What is claimed:

1. A flexible annular cartridge for joining and sealing a bell and spigot pipe joint, the cartridge comprising:
   (a) an annular member having outer and inner surfaces and opposite first and second ends, comprising a plurality of pipe gripping members positioned on the inner surface;
   (b) a flexible annular gasket having outer and inner surfaces, opposite first and second ends, and a circumferentially extending sealing lip projecting inwardly from the gasket inner surface, wherein the annular member first end engages the flexible annular gasket second end;
   (c) a backup ring having a hardness that exceeds a hardness of the gasket, wherein the backup ring engages the gasket at the gasket first end; and
   (d) a proximately frustoellipsoidal outer contour.

2. The cartridge of claim 1, wherein the annular cartridge is adapted to be inserted within a bell socket to surround and seal a pipe spigot inserted therein.

3. The cartridge of claim 1, in which the backup ring has a hardness of at least about 70 employing durometer type Shore A.

4. The cartridge of claim 1, in which the backup ring has a hardness of about 70-95 employing durometer type Shore A.

5. The cartridge of claim 1, in which the backup ring has a hardness of about 75-90 employing durometer type Shore A.

6. The cartridge of claim 1, in which the backup ring has a hardness of about 80 employing durometer type Shore A.

7. The cartridge of claim 1, in which the gasket has a hardness of about 50-70 employing durometer type Shore A.

8. The cartridge of claim 1, in which the plurality of pipe gripping members have a hardness of about 40-55 employing the Rockwell C scale.

9. The cartridge of claim 1, wherein the outer contour of the cartridge is proximately frustospherical.

10. The cartridge of claim 1, wherein the gasket is constructed from an elastomer.

11. The cartridge of claim 1, wherein the gasket is constructed from an elastomer selected from the group consisting of: styrene butadiene rubber, ethylene propylene diene monomer, nitrile, and neoprene.

12. The cartridge of claim 1, wherein the annular member is constructed from a metal material.

13. The cartridge of claim 1, wherein the annular member is constructed from ductile iron.

14. The cartridge of claim 1, wherein the annular member comprises a plurality of interlocking segments, each segment comprising one of the plurality of pipe gripping members positioned to grip a surface of the pipe spigot.

15. The cartridge of claim 1, wherein the annular member consists essentially of a plurality of interlocking segments, each segment comprising one of the plurality of pipe gripping members positioned to grip a surface of the pipe spigot.

16. The cartridge of claim 1, wherein the annular member comprises a plurality of interlocking segments, each segment comprising: one of the plurality of pipe gripping members positioned to grip a surface of the pipe spigot; and a cavity on each side of the pipe gripping member.

17. The cartridge of claim 1, wherein the annular member comprises a plurality of interlocking segments, each segment comprising:
   (a) one of the plurality of pipe gripping members positioned to grip a surface of the pipe spigot;
   (b) opposite first and second ends;
   (c) a male connector extending outwardly from the first end of the segment; and
   (d) a female connector extending inwardly from the second end of the segment.

18. The cartridge of claim 1, wherein the annular member comprises a plurality of interlocking segments, each segment comprising:
   (a) one of the plurality of pipe gripping members positioned to grip a surface of the pipe spigot;
   (b) opposite first and second ends;
   (c) a male connector extending outwardly from the first end of the segment; and
   (d) a female connector extending inwardly from the second end of the segment;
wherein the male connector of each said segment engages the female connector of an adjacent segment.

19. The cartridge of claim 1, wherein the annular member comprises a plurality of interlocking segments, each segment comprising one of the plurality of pipe gripping members positioned to grip a surface of the pipe spigot, wherein each pipe gripping member comprises a tooth.

20. The cartridge of claim 1, wherein the annular member comprises a plurality of interlocking segments, each segment comprising one of the plurality of pipe gripping members positioned to grip a surface of the pipe spigot, wherein each pipe gripping member comprises a straight tooth.

21. The cartridge of claim 1, wherein the annular member comprises a plurality of interlocking segments, each segment comprising one of the plurality of pipe gripping members positioned to grip a surface of the pipe spigot, wherein each pipe gripping member comprises a plurality of teeth.

22. The cartridge of claim 1, wherein the annular member comprises a plurality of interlocking segments, each segment comprising one of the plurality of pipe gripping members positioned to grip a surface of the pipe spigot, wherein each pipe gripping member comprises a plurality of teeth in adjacent relationship.

23. The cartridge of claim 1, wherein the annular member comprises a plurality of interlocking segments, each segment comprising one of the plurality of pipe gripping members positioned to grip a surface of the pipe spigot, wherein each pipe gripping member comprises a plurality of teeth in adjacent, spaced-apart relationship.

24. The cartridge of claim 1, wherein the gasket comprises a plurality of prongs extending outwardly from the second surface thereof, wherein the annular member first end comprises a plurality of cavities engaged to the plurality of prongs.

25. The cartridge of claim 1, wherein the gasket comprises a plurality of prongs extending outwardly from the second surface thereof, wherein the annular member first end comprises a plurality of cavities engaged to the plurality of prongs with an adhesive.

26. The cartridge of claim 1, wherein the annular member is constructed of a polymeric material, in which the plurality of pipe gripping members are constructed from a metal material.

27. A method of joining and sealing a bell and spigot pipe joint, the method comprising:

(a) providing a pipe socket having a proximately ellipsoidal inner contour, and defining an opening and a longitudinal socket axis;
(b) providing the flexible annular cartridge of claim 1, defining a longitudinal cartridge axis;
(c) orienting the cartridge such that the longitudinal cartridge axis is approximately perpendicular to the longitudinal socket axis;
(d) inserting the cartridge into the socket; and
(e) rotating the cartridge such that the longitudinal cartridge axis is approximately parallel to the longitudinal socket axis.

28. A pipe joint comprising:
(a) a pipe socket having an ellipsoidal inner contour; and
(b) the flexible annular cartridge of claim 1 inserted within the socket, such that the outer contour of the cartridge complements the inner contour of the socket, and such that the cartridge is free to rotate within the socket.

* * * * *